United States Patent
Becker et al.

(10) Patent No.: US 10,614,125 B1
(45) Date of Patent: *Apr. 7, 2020

(54) MODELING AND EXTRACTING ELEMENTS IN SEMI-STRUCTURED DOCUMENTS

(71) Applicant: INTUIT INC., Mountain View, CA (US)

(72) Inventors: Richard J. Becker, Alberta (CA); Carolina S. Gomes, Edmonton (CA); Daniel L. Moise, Edmonton (CA); Horace Chan, Edmonton (CA)

(73) Assignee: INTUIT INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/146,948

(22) Filed: Sep. 28, 2018

Related U.S. Application Data

(63) Continuation of application No. 14/814,977, filed on Jul. 31, 2015, now Pat. No. 10,114,906.

(51) Int. Cl.
G06F 17/10 (2006.01)
G06F 16/80 (2019.01)
G06F 17/50 (2006.01)

(52) U.S. Cl.
CPC .......... G06F 16/80 (2019.01); G06F 17/5009 (2013.01)

(58) Field of Classification Search
None
See application file for complete search history.

(56) References Cited

U.S. PATENT DOCUMENTS

| | | | | |
|---|---|---|---|---|
| 6,282,537 B1* | 8/2001 | Madnick | ............. | G06F 16/2471 707/716 |
| 6,449,620 B1* | 9/2002 | Draper | ................. | G06F 16/258 |
| 7,149,347 B1* | 12/2006 | Wnek | ................ | G06K 9/00469 382/159 |
| 7,716,167 B2* | 5/2010 | Colossi | ................ | G06F 16/283 707/714 |
| 7,764,830 B1* | 7/2010 | Wnek | ................ | G06K 9/00469 382/159 |

(Continued)

OTHER PUBLICATIONS

Chen et al., Human-Readable Semi-Structured Scientific Documents, 4th International Conference on Computer Science and Network Technology, 2015 IEEE.

(Continued)

*Primary Examiner* — Rehana Perveen
*Assistant Examiner* — Cuong V Luu
(74) *Attorney, Agent, or Firm* — Patterson + Sheridan, LLP

(57) ABSTRACT

The disclosed embodiments provide a system that describes a semi-structured document for the purpose of acquiring a set of data elements from the semi-structured document. During operation, the system obtains a physics model of a semi-structured document, wherein the physics model includes a set of relationships represented by physical objects that describe relative positions of a set of data elements in the semi-structured document. Next, the system applies the physics model to a representation of the semi-structured document to automatically extract a set of data from the representation. The system then provides the extracted set of data for use with one or more applications without requiring manual input of the data into the one or more applications.

20 Claims, 6 Drawing Sheets

(56) References Cited

U.S. PATENT DOCUMENTS

| | | | | |
|---|---|---|---|---|
| 8,407,266 B1* | 3/2013 | Pan | G06F 16/16 | 707/827 |
| 8,584,029 B1* | 11/2013 | Gerde | G06F 3/0488 | 715/771 |
| 8,589,262 B1* | 11/2013 | Wang | G06F 17/27 | 382/137 |
| 9,158,654 B1* | 10/2015 | Thornton | G06F 11/3608 | |
| 2002/0087571 A1* | 7/2002 | Stapel | G06F 16/258 | |
| 2003/0101076 A1* | 5/2003 | Zaleski | G06Q 50/22 | 705/2 |
| 2006/0161559 A1* | 7/2006 | Bordawekar | G06F 17/2247 | |
| 2006/0242180 A1* | 10/2006 | Graf | G06F 16/86 | |
| 2007/0282923 A1* | 12/2007 | Ward | G06F 16/20 | |
| 2008/0017722 A1* | 1/2008 | Snyder | G06Q 10/00 | 235/494 |
| 2009/0327230 A1* | 12/2009 | Levin | G06F 16/40 | |
| 2010/0250497 A1* | 9/2010 | Redlich | F41H 13/00 | 707/661 |
| 2012/0078969 A1* | 3/2012 | Ananthanarayanan | G06F 16/355 | 707/798 |
| 2012/0096430 A1* | 4/2012 | Lin | G06F 8/10 | 717/107 |
| 2012/0215669 A1* | 8/2012 | Lieberman | G06Q 40/123 | 705/31 |
| 2014/0244456 A1* | 8/2014 | Huang | G06Q 40/123 | 705/31 |
| 2014/0348396 A1* | 11/2014 | Laaser | G06K 9/00442 | 382/113 |
| 2015/0317610 A1* | 11/2015 | Rao | G06Q 10/1053 | 705/321 |
| 2015/0347523 A1* | 12/2015 | Patel | H04L 67/1097 | 707/623 |
| 2016/0019192 A1* | 1/2016 | Crapo | G06F 17/2785 | 715/234 |
| 2016/0092549 A1* | 3/2016 | Byron | G06F 16/3344 | 707/739 |
| 2016/0098645 A1* | 4/2016 | Sharma | G06N 7/005 | 706/12 |
| 2016/0188746 A1* | 6/2016 | Cypher | G06F 16/80 | |
| 2017/0255694 A1* | 9/2017 | Byron | G06F 16/3344 | |

OTHER PUBLICATIONS

Adelberg, Brad, NoDoSE—A Tool for Semi-Automatically Extracting Structured and Semistructured Data from Text Documents, 1998 ACM 0-89791-995-5.

Augereau et al., Semi-structured document image matching and recognition Proc. of SOIE & Electronic Imaging, SPIE vol. 8658, 865804, 2013.

Peter Kosa, Structured Data Extraction from Unstructured Text, Charles University oin Prague, Department of Software Engineering, Prague 2013.

Brefeld et al., Eighth Workshop on Mining and Learning with Graphs, SIGKDD Explorations, vol. 12, Issue 2, 2010.

* cited by examiner

MODELING AND EXTRACTING ELEMENTS IN SEMI-STRUCTURED DOCUMENTS

CROSS-REFERENCE TO RELATED APPLICATIONS

This application is a continuation of U.S. patent application Ser. No. 14/814,977, entitled "Modeling and Extracting Elements in Semi-Structured Documents," filed Jul. 31, 2015 and assigned to the assignee hereof, the contents of which are herein incorporated by reference in their entirety.

BACKGROUND

The disclosed embodiments relate to techniques for extracting data. More specifically, the disclosed embodiments relate to techniques for modeling and extracting elements in semi-structured documents.

Data processing and data exchange operations are essential to many business and personal transactions. For example, small businesses may use accounting and/or inventory data to obtain and share reports regarding inventory sales, customer invoices, and/or cash flow. Similarly, healthcare providers may examine medical records to view patient information related to insurance providers, medical conditions, and/or office visits.

In addition, data exchange among users frequently involves the use of electronic documents such as word-processing documents, spreadsheets, and/or Portable Document Format (PDF) documents. For example, a business may manage business transactions with a set of customers by creating a set of bills, invoices, and/or other types of electronic documents containing data associated with the business transactions and transmitting the electronic documents to the respective customers via email. The customers may use the data in the electronic documents to pay the bills and/or invoices, respond to the business, and/or update their records of the transactions.

However, variations in the layouts and/or designs of electronic documents may preclude efficient extraction and/or transfer of data from the electronic documents. For example, a customer may receive electronic bills, invoices and/or other semi-structured electronic documents from a variety of businesses and/or companies. While the electronic documents may include many of the same types of data, the locations of the data may vary across electronic documents from different companies. As a result, the customer may be unable to automatically extract the data from the electronic documents into the application. Instead, the customer may be required to manually enter the data from the electronic documents into an application for managing the data (e.g., an accounting application).

Consequently, use of semi-structured electronic documents may be facilitated by mechanisms for automatically extracting data from the electronic documents.

SUMMARY

Semi-structured documents such as tax forms, bills, or invoices often contain specific types of data without adhering to a strict layout or format for showing the data. Such variations in layout or format may interfere with efficient extraction and/or transfer of the data. For example, extracting data elements from a semi-structured document may require the manual creation of a template for each variation of the semi-structured document, or alternatively, manual entry of the data into an application for storing or using the data.

To simplify the extraction of data elements across variations of a semi-structured document, a model of the semi-structured document may be generated. The model may include a set of relationships among relative positions of the set of data elements in the semi-structured document. For example, the model may be a Newtonian physics model that describes the relative positions of the data elements in terms of mechanical objects such as springs, struts, pulleys, and/or levers. Each data element may be a target data element that contains data to be extracted or a marker data element containing an identifiable feature in the semi-structured document. Relationships among target data elements and/or marker data elements may include horizontal components, vertical components, distance components, angular components, weights, and/or directions. As a result, the data may be extracted from a representation of the semi-structured document by using the relationships in the model to identify the locations of the data elements in the representation and extracting the data from the locations. In turn, the extracted data may be used with an application without requiring manual input of the data into the application and/or creation of a custom template that matches the exact layout or format of the representation.

The disclosed embodiments provide a system that describes a semi-structured document for the purpose of acquiring a set of data elements from the semi-structured document. During operation, the system obtains a physics model of a semi-structured document, wherein the physics model includes a set of relationships represented by physical objects that describe relative positions of a set of data elements in the semi-structured document. Next, the system applies the physics model to a representation of the semi-structured document to automatically extract a set of data from the representation. The system then provides the extracted set of data for use with one or more applications without requiring manual input of the data into the one or more applications.

In some embodiments, the system also updates the physics model based on a set of locations of the data elements in the representation.

In some embodiments, obtaining the physics model of the semi-structured document includes displaying the semi-structured document in a graphical user interface (GUI) to a user, and obtaining, through the GUI, the set of relationships among the relative positions of the set of data elements from the user.

In some embodiments, obtaining the physics model of the semi-structured document includes using a statistical model to identify the set of relationships among the relative positions of the set of data elements in the semi-structured document.

In some embodiments, using the statistical model to identify the set of relationships among the relative positions of the set of data elements includes using the statistical model to iteratively adjust the set of relationships based on a set of locations of the data elements in a set of representations of the semi-structured document.

In some embodiments, the set of data elements includes a target data element containing data to be used with the one or more applications, and a marker data element containing an identifiable feature in the semi-structured document.

In some embodiments, the physics model includes a relationship between a first position of the target data element and a second position of the marker data element.

In some embodiments, the relationship includes a horizontal component, a vertical component, and a weight.

In some embodiments, the relationship further includes a direction.

In some embodiments, the identifiable feature includes an image.

In some embodiments, the identifiable feature includes text.

In some embodiments, applying the physics model to the representation of the semi-structured document to automatically extract the set of data from the representation includes: (i) using the physics model to identify a location of a data element in the representation; (ii) using the location of the data element and the set of relationships to identify additional locations of one or more additional data elements in the representation; and (iii) using the location and the additional locations to extract the set of data from the representation.

In some embodiments, using the location of the data element and the set of relationships to identify the additional locations of the one or more additional data elements in the representation includes using the location of the data element and one or more parameters of a relationship between the data element and another data element to define a region in the representation in which the other data element is located.

In some embodiments, the set of relationships includes a distance component, an angular component, and a weight.

In some embodiments, the physics model is a Newtonian physics model.

BRIEF DESCRIPTION OF THE DRAWINGS

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Semi-structured documents such as tax forms, bills, or invoices often contain specific types of data without adhering to a strict layout or format for showing the data. Such variations in layout or format may interfere with efficient extraction and/or transfer of the data. For example, extracting data elements from a semi-structured document may require the manual creation of a template for each variation of the semi-structured document, or alternatively, manual entry of the data into an application for storing or using the data.

To simplify the extraction of data elements across variations of a semi-structured document, a model of the semi-structured document may be generated. The model may include a set of relationships among relative positions of the set of data elements in the semi-structured document. For example, the model may be a Newtonian physics model that describes the relative positions of the data elements in terms of mechanical objects such as springs, struts, pulleys, and/or levers. Each data element may be a target data element that contains data to be extracted or a marker data element containing an identifiable feature in the semi-structured document. Relationships among target data elements and/or marker data elements may include horizontal components, vertical components, distance components, angular components, weights, and/or directions. As a result, the data may be extracted from a representation of the semi-structured document by using the relationships in the model to identify the locations of the data elements in the representation and extracting the data from the locations. In turn, the extracted data may be used with an application without requiring manual input of the data into the application and/or creation of a custom template that matches the exact layout or format of the representation.

Figure 1:
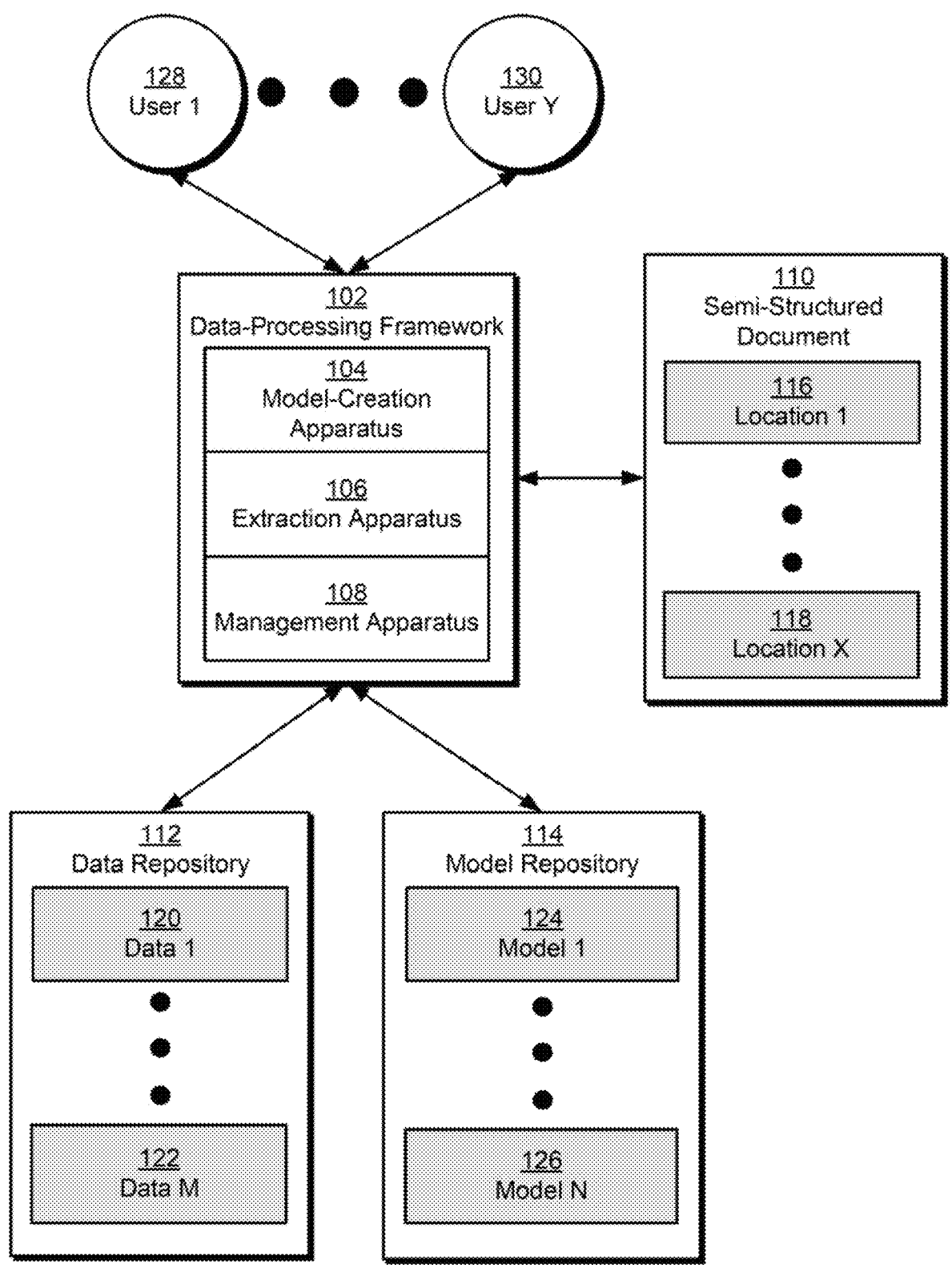
FIG. 1 shows a schematic of a system in accordance with the disclosed embodiments.

The disclosed embodiments provide a method and system for processing data. More specifically, the disclosed embodiments provide a method and system for describing semi-structured documents for the purpose of acquiring data from the semi-structured documents. As shown in FIG. 1, the data may be included in a semi-structured document 110 such as a word-processing document, spreadsheet, Portable Document Format (PDF) document, web page, and/or another type of formatted electronic document containing semi-structured data. For example, semi-structured document 110 may be a bill, invoice, form, statement, transcript, record, receipt, tax document (e.g., W-2, 1099-Int, 1099-DIV, consolidated brokerage statement, 1040, 1040A, 1040EZ, Schedule A, Schedule C, 1095-A, 1095-B, 1095-C), and/or other type of document that includes a specific type and/or set of data (e.g., data 1 120, data m 122) without adhering to a strict layout and/or format for showing the data.

The lack of common design, layout, and/or format between semi-structured document 110 and other semi-structured electronic documents may prevent efficient extraction and/or transfer of data from semi-structured document 110 to an application used to process and/or manage the data. For example, data may be automatically extracted to the application from a widely used document (e.g., a government form) after an engineering team updates the application with code that can process the document. On the other hand, custom development of data-extraction code may be unfeasible for a large number of less common documents and/or documents that frequently vary in design and/or layout. Instead, users (e.g., user 1 128, user y 130) of the electronic documents may be involved in a tedious, time-consuming, and/or error-prone process of manually entering data from the electronic documents into the application before using the data with the application.

In one or more embodiments, the system of FIG. 1 includes functionality to automatically extract data from semi-structured document 110 and/or other semi-structured electronic documents, despite differences in the locations (e.g., location 1 116, location x 118) of data in the semi-structured documents. As shown in FIG. 1, the system may be provided by a data-processing framework 102 that uses one or more models (e.g., model 1 124, model n 126) of the semi-structured documents to extract the data from the semi-structured documents.

Each model may specify a set of relationships among relative positions of a set of data elements in a semi-structured document (e.g., semi-structured document 110). In one or more embodiments, the models include Newtonian physics models that describe the relative positions of target data elements containing data to be extracted and/or market data elements containing identifiable features in the semi-structured document in terms of physical objects such as springs, struts, and/or levers. Relationships among target data elements and/or marker data elements may include horizontal components, vertical components, angular components, distance components, weights, and/or directions. For example, a relationship between two data elements may be represented by a spring with a length and orientation. To accommodate variations in the relative positions of the data elements, the spring may be associated with a weight that represents the tension on the spring in one or both directions. In turn, the weight may allow one data element to be found within a region of semi-structured document 110 that is defined relative to the location of the other data element. Models of semi-structured documents are described in further detail below with respect to FIGS. 2-3.

In one or more embodiments, a model of semi-structured document 110 is created using a model-creation apparatus 104 in data-processing framework 102. To create the model, model-creation apparatus 104 may obtain input from a user. For example, model-creation apparatus 104 may display semi-structured document 110 in a graphical user interface (GUI). Model-creation apparatus 104 may also provide one or more user-interface elements for selecting regions, characters, rows, and/or columns representing data elements in the displayed semi-structured document 110, as well as one or more user-interface elements for specifying the parameters of relationships among the data elements.

Model-creation apparatus 104 may also create and/or tune the relationships in the model using a machine-learning technique. For example, model-creation apparatus 104 may apply a statistical model such as a decision tree, clustering technique, and/or classification technique to identify or refine the relationships among the relative positions of data elements in semi-structured document 110. After the model is created, model-creation apparatus 104 may store the model in a model repository 114 for subsequent retrieval and use.

To further improve the accuracy, flexibility, and/or scope of the model, model-creation apparatus 104 may iteratively update the model based on variations in representations of semi-structured document 110. For example, model-creation apparatus 104 may display and/or overlay different representations of semi-structured document 110 within the GUI to allow the user to adapt the relationships in the model to different locations of the data elements in the representations. In another example, model-creation apparatus 104 may input a set of locations of the data elements in a set of representations of semi-structured document 110 to the statistical model, and the statistical model may iteratively adjust the relationships based on the inputted locations. In a third example, the statistical model may be applied to a series of representations of semi-structured document 110 to initially identify the data elements and relationships among the data elements in semi-structured document 110. The data elements and relationships may then be displayed within the GUI, and the user may validate the data elements and relationships and/or select a subset of the data elements as target data elements and/or other types of data elements.

Next, an extraction apparatus 106 in data-processing framework 102 may use the model to automatically extract the data elements from a representation of semi-structured document 110. First, extraction apparatus 106 may use the model to identify a location of a data element in the representation. For example, extraction apparatus 106 may use one or more relationships in the model to locate a data element within a particular region of semi-structured document 110. Next, extraction apparatus 106 may use the identified location of the data element and the relationships to identify additional locations of other data elements in the representation. For example, extraction apparatus 106 may use relationships between the data element and other data elements to locate the other data elements. Once a data element is found in the representation, the relationships between the data element and other data elements may be used to locate the other data elements in the representation. If a data element cannot be found in the representation, extraction apparatus 106 may use relationships between data elements with known locations and other data elements to search for the other data elements in the representation.

Extraction apparatus 106 may then use the identified locations of data elements in the representation to extract data from the representation. For example, extraction apparatus 106 may use the locations to extract embedded text from a PDF document, word-processing document, spreadsheet, and/or other type of text-based electronic document. Alternatively, extraction apparatus 106 may perform optical character recognition (OCR) of the locations in a scanned and/or photographed image of the representation.

Model-creation apparatus 104 may also use the locations of the data elements in the representation to update the model. For example, model-creation apparatus 104 may adjust the parameters of a relationship between the relative positions of two data elements to accommodate a distance between the data elements in the representation that is larger than allowed by previous values of the parameters.

A management apparatus 108 in data-processing framework 102 may then enable, for the user, use of the extracted data with an application without requiring manual input of the data into the application by the user. First, management apparatus 108 may store the data in a data repository 112 for subsequent use with the application and/or other applications. Second, management apparatus 108 may provide a user interface for importing the data into the application. Alternatively, management apparatus 108 may form a part of the application and allow the user to interact directly with the data. For example, management apparatus 108 may allow the user to view the data, update his/her records with the data, transmit and/or share the data with one or more other users, and/or perform other tasks associated with the data through the application.

As mentioned above, the model of semi-structured document 110 may be stored in model repository 114 for subsequent use. Model repository 114 may also include other models for other types of semi-structured documents from one or more users (e.g., user 1 128, user y 130). As with the model for semi-structured document 110, the other models may describe the relative positions of data elements in the other semi-structured documents, as specified by the other user(s) and/or machine-learning techniques. The models may then be provided to extraction apparatus 106 for use in extracting data from additional semi-structured documents.

More specifically, extraction apparatus 106 may obtain a model that is compatible with each semi-structured document to be processed. The model may be selected by a user associated with the semi-structured document. For example, extraction apparatus 106 may display a set of images representing the models and/or semi-structured documents represented by the models to the user and allow the user to select a given model from the displayed images. To facilitate the user's identification and/or selection of the appropriate model, extraction apparatus 106 may also enable filtering of the set of models by the user based on attributes such as a model name, a type of semi-structured document associated with each model, a creator, a date created, a date modified, one or more keywords, and/or one or more data elements in the semi-structured document.

Extraction apparatus 106 may also match the model to the semi-structured document, in addition to or in lieu of obtaining the user's selection of the model. For example, extraction apparatus 106 may compare the layout of the semi-structured document with the relationships and/or relative positions of data elements in each model to determine a "fit" of the semi-structured document to the model. Extraction apparatus 106 may also match the semi-structured document to the model based on the source (e.g., Uniform Resource Locator (URL), directory, filename, etc.) of the semi-structured document and/or metadata in the semi-structured document. Extraction apparatus 106 may then select the model with the best fit for use in extracting data from the semi-structured document. Alternatively, extraction apparatus 106 may reduce the set of possible models for the semi-structured document so that models with a fit above a certain threshold are presented to the user for selection and models that fall below the threshold are omitted from presentation to the user. Finally, if no models are suitable for use with the semi-structured document, the user may create a new model for the semi-structured document and/or other semi-structured documents with the same layout and/or format, and data-processing framework 102 may use the newly created model to extract data from the semi-structured document(s).

By using models to describe the positional relationships of data elements within semi-structured documents, data-processing framework 102 may enable the extraction of data from different representations of the semi-structured documents without creating a separate template for each representation or requiring manual input of the data by a user. At the same time, the relationships in the model can be converted into formulas that are applied directly to the representations to locate the data elements and extract data from the representations in a consistent and unambiguous way. The model may additionally accommodate artifacts and/or distortions in image-based representations of the semi-structured documents, such as photographs of the semi-structured documents. Finally, the use of basic physical concepts to describe the relationships may allow the models to be created or applied using software packages such as physics engines and/or enable the gamification of the model definition process.

Those skilled in the art will appreciate that the system of FIG. 1 may be implemented in a variety of ways. First, model-creation apparatus 104, extraction apparatus 106, management apparatus 108, data repository 112, and model repository 114 may be provided by a single physical machine, multiple computer systems, a grid, one or more databases, one or more filesystems, and/or a cloud computing system. In addition, model-creation apparatus 104, extraction apparatus 106, and management apparatus 108 may be provided by the same hardware and/or software component or execute independently from one another. For example, model-creation apparatus 104, extraction apparatus 106, and management apparatus 108 may form a part of an application that is used to process and manage data from a set of semi-structured documents for a user. On the other hand, one or more components of data-processing framework 102 may execute outside the application and provide data from the semi-structured documents in a form that can be used by the application after extracting the data from the semi-structured documents.

Second, data-processing framework 102 may be configured for use with various types of semi-structured documents and/or data. For example, data-processing framework 102 may accept multiple types and/or file formats of semi-structured documents and/or include functionality to convert the semi-structured documents into a file format that is suitable for data extraction. Data-processing framework 102 may further obtain and/or store data in data repository 112 and/or models in model repository 114 as relational-database records, property lists, Extensible Markup Language (XML) documents, JavaScript Object Notation (JSON) objects, and/or other types of structured data.

Figure 2:
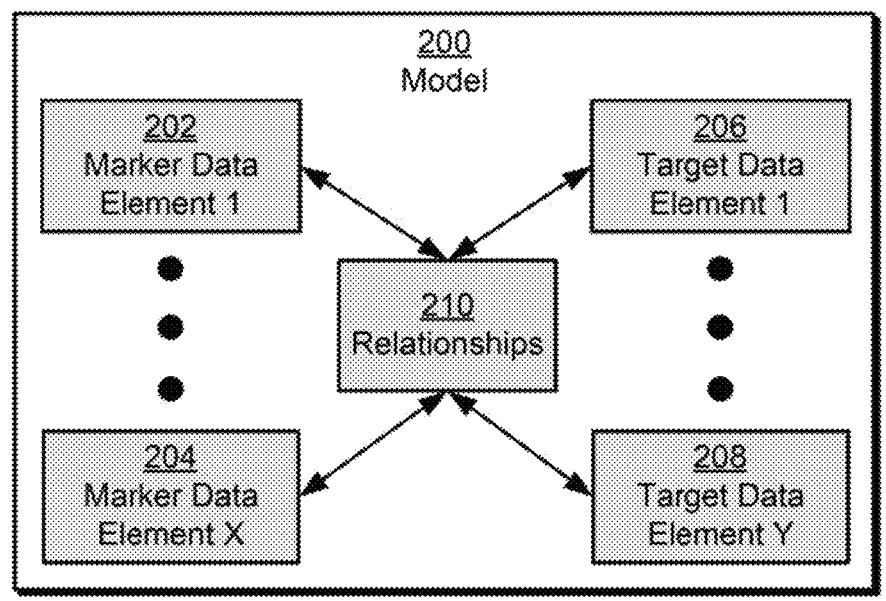
FIG. 2 shows a model of a semi-structured document in accordance with the disclosed embodiments.

FIG. 2 shows a model 200 of a semi-structured document (e.g., semi-structured document 110 of FIG. 1) in accordance with the disclosed embodiments. As described above, model 200 may be used to extract data from a semi-structured document such as a form, bill, invoice, transcript, tax document, and/or receipt. As a result, model 200 may include information that defines, identifies, and/or locates the data within the electronic document.

Model 200 may include a set of marker data elements (e.g., marker data element 1 202, marker data element x 204) and a set of target data elements (e.g., target data element 1 206, target data element y 208). The target data elements may contain data to be extracted from the semi-structured document. For example, target data elements in a W-2 tax form may contain information such as a name and address for an employer and an employee, the employee's annual wages with the employer, and/or the taxes withheld from the employee's paycheck. Such information may be extracted for use with a tax-preparation application, financial-management application, and/or accounting application.

The marker data elements may include identifiable features that recur in different representations of the semi-structured document. For example, marker data elements in a tax form may include edges of the tax form, a title of the tax form, text in the tax form, logos in the tax form, labels of boxes in the tax form, and/or edges of boxes in the tax form.

Each target or marker data element may be represented by a set of metadata in model 200. For example, each data element may be defined in model 200 using a unique identifier for the data element, a name of the data element, and/or a flag identifying the data element as a target or a marker. Model 200 may also include a data type of the data element, which specifies a valid format and/or range of values for the data element. For example, a data element for a price may have a positive numeric data type, while a data element for a Social Security number (SSN) may have a data type that requires 9 numeric digits with dashes in between the third and fourth digits and the fifth and sixth digits. The data type may also specify and/or describe non-text-based types of data, such as images, colors, edges, and/or shapes. In turn, the data type may be used to match the data element to potential locations of the data element within a representation of the semi-structured document.

Each data element may optionally include information describing the shape, size, and/or orientation of the data element within the semi-structured document. For example, a data element containing a graphical object may include the relative dimensions of the graphical object, while a data element containing text may include the number of lines occupied by the text and/or a relative size of the text.

Model 200 may also include a set of relationships 210 among the target data elements and marker data elements. Relationships 210 may describe the relative positions of the target and marker data elements with respect to one another. As mentioned above, relationships 210 may be defined using concepts in Newtonian physics. For example, relationships 210 may be represented by struts, springs, levers, pulleys, and/or other physical objects.

Each relationship may include a horizontal component, a vertical component, a distance component, an angular component, a weight, and/or a direction. For example, two data elements may be separated by a distance that is represented by a spring. The orientation and/or length of the spring may be specified by one or more pairs of coordinates along horizontal and vertical axes, or alternatively, by a distance and an angle in a polar coordinate system. The spring may also be associated with one or more directions of displacement, as well as one or more "spring constants" representing the amount of displacement the spring can experience in each direction. As a result, the spring may represent a range of relative positions of the data elements within the semi-structured document.

In another example, the relative positions of two data elements may be described using a strut or lever. The length of the strut or lever may describe a relatively fixed distance between the data elements, while the orientation of the strut or lever may be associated with a weight that specifies a range of angles within which the data elements may be positioned.

The relative positions of data elements in model 200 may further be fine-tuned using multiple relationships 210 among the same data elements and/or one or more relationships containing multiple data elements. In one example, model 200 may include a relationship in which three or more data elements are distributed along a circle, semi-circle, ellipse, polyhedron, and/or other shape. In a second example, model 200 may include a first relationship that describes a range of distances between two data elements and a second relationship that describes a range of angular positions that can be occupied by the two data elements.

In turn, relationships 210 may be used to locate the data elements within representations of the semi-structured document and extract data from the target data elements in the representations. For example, model 200 may be used to create an "extraction graph," with nodes in the extraction graph representing data elements and edges in the extraction graph representing relationships 210. The extraction graph may be used to initially establish the location of one or more data elements (e.g., marker data elements) in a representation of the semi-structured document. After the locations of the data element(s) are established, the edges in the extraction graph may be used to locate additional data elements in the representation until the entire extraction graph is traversed. Once a given data element is found, the extraction graph may be adjusted based on the location of the data element. For example, the locations of two data elements with a relationship in model 200 may be used to establish a sense of scale in the representation, which may then be used to locate other data elements in model 200. Conversely, if a data element in model 200 cannot be found in the representation, the locations of other data elements may be used with the extraction graph to find the remaining data elements in the representation.

Those skilled in the art will appreciate that model 200 may describe the layout of the semi-structured document in other ways. For example, model 200 may be a Lagrangian mechanical model, a topological model, and/or other type of physical or mathematical model. Similarly, model 200 may include or exclude certain types of data elements. For example, model 200 may define different types of data elements for specific types of data (e.g., graphical objects, numbers, currency, boxes, rows, columns, etc.). In another example, model 200 may include relationships 210 among a set of target data elements (e.g., in a form or table) without describing marker data elements in relation to the target data elements.

Figure 3:
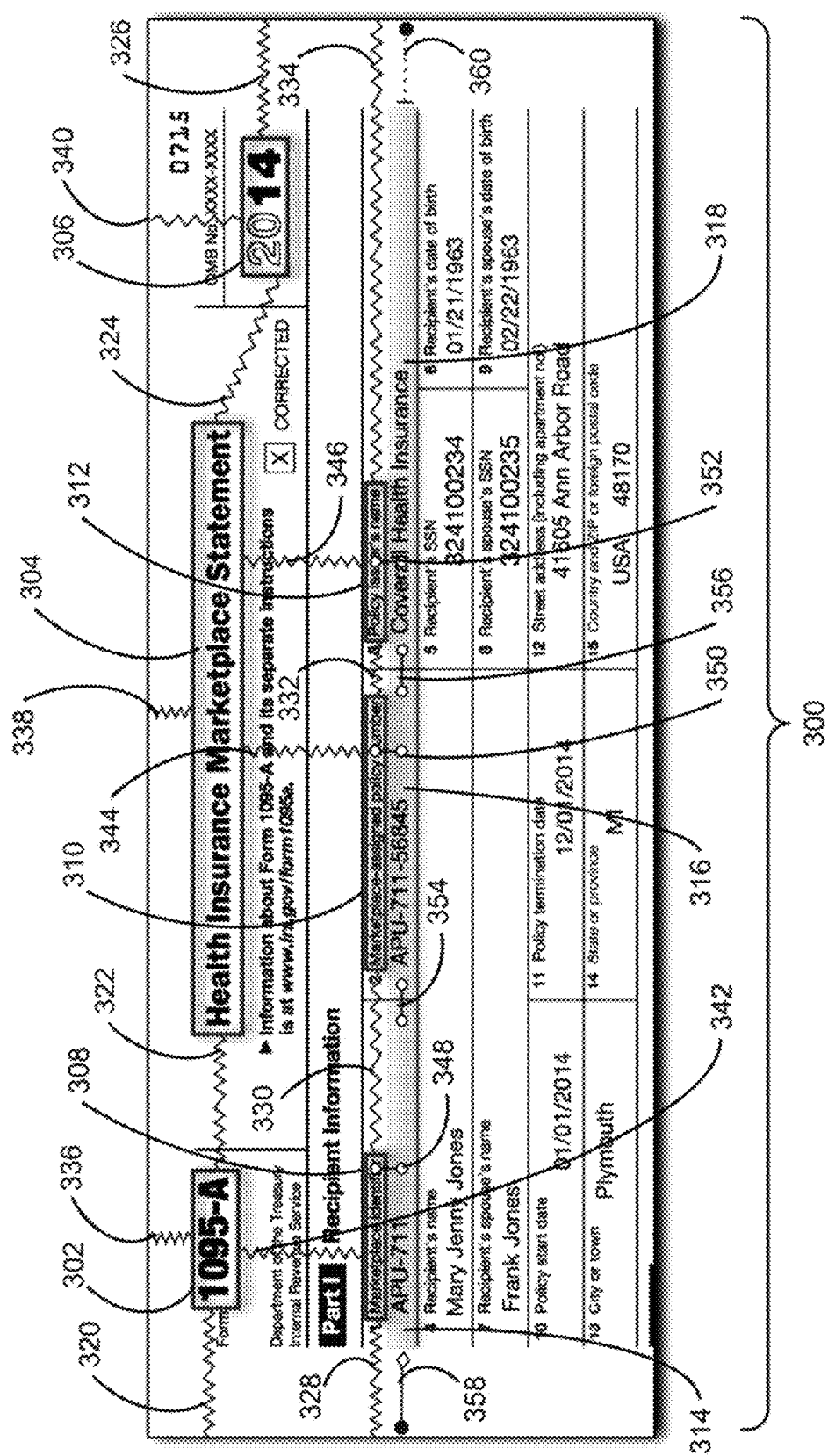
FIG. 3 shows an exemplary screenshot in accordance with the disclosed embodiments.

FIG. 3 shows an exemplary screenshot in accordance with the disclosed embodiments. More specifically, FIG. 3 shows a screenshot of a GUI for creating a model of a semi-structured document, such as semi-structured document 110 of FIG. 1. The GUI may be provided by a model-creation apparatus, such as model-creation apparatus 104 of FIG. 1.

As shown in FIG. 3, the GUI includes a representation 300 of the semi-structured document. For example, representation 300 may be a digital and/or digitized version of a tax form. Representation 300 may be provided by the model-creation apparatus as an example of the semi-structured document, or representation 300 may be created and/or selected by a user (e.g., from a file, by scanning a physical copy of the semi-structured document, by taking a photo of the semi-structured document, etc.).

As discussed above, the GUI may allow the user to specify a set of relationships 320-360 among a set of data elements 302-318 in representation 300. Data elements 302-312 may be marker data elements with identifiable features that are shared across representations of the semi-structured document, and data elements 314-318 may be target data elements that contain data to be extracted from the representations. For example, data element 302 may include an identifier (e.g., "1095-A") for a tax form, data element 304 may include a name (e.g., "Health Insurance Marketplace Statement") of the tax form, and data element 306 may include a year (e.g., "2014") related to the tax form. Data elements 308-312 may be headings (e.g., ""Marketplace Identifier," "Marketplace-assigned policy number," "Policy issuer's name") for boxes in the tax form, and data elements 314-318 may contain data (e.g., "APU-711," "APU-711-56845," "Coverall Health Insurance") to be extracted from the boxes.

Relationships 320-360 may specify the relative positions of data elements 302-318 in representation 300 and/or other representations of the semi-structured document. As mentioned previously, relationships 320-360 may be defined using physical concepts that are easily understood. For example, relationships 320-346 may be modeled using flexible components such as springs, while relationships 348-360 may be modeled using more rigid components such as struts and/or levers.

Relationships 320-360 may be associated with horizontal components, vertical components, angles, and/or distances. For example, relationships 320, 322, 326-334, and 356-360 may contain largely horizontal components, relationships 336-352 may contain largely vertical components, and relationship 324 may include both horizontal and vertical components. Alternatively, relationships 320-360 may be defined in polar coordinates, which include an angular component and a distance component.

Each relationship may also include one or more parameters that define a range of valid positions that can be occupied by the data elements connected by the relationship. For example, spring-based relationships 320-346 may include directions and/or weights that describe the amounts by which the springs can compress and/or stretch, which in turn may be used to define a set of regions in which data elements 302-312 connected by relationships 320-346 may be found. On the other hand, strut-based relationships 348-360 may include narrower ranges of valid distances between data elements 308-318, or conversely, may omit distance information and describe only the adjacency of data elements 308-318 (e.g., vertically adjacent, horizontally adjacent, etc.) in the semi-structured document.

To specify data elements 302-318 and relationships 320-360, the user may use a number of user-interface elements (not shown) provided by the GUI. For example, the user may use text-selection tools and/or area-selection tools to identify data elements 302-318 in representation 300. Next, the user may use connector tools and/or drawing tools to connect data elements 302-318 with relationships 320-360. Finally, the user may use text boxes, radio buttons, drop-down menus, checkboxes, and/or other user-interface elements to select or enter parameters associated with data elements 302-318 and relationships 320-360.

The model may also be created and/or updated using a statistical model. For example, a machine-learning technique may be used to analyze a series of representations of the semi-structured document to fine-tune the parameters associated with data elements 302-318 and/or relationships 320-360 so that the model accounts for variations in layout or scale across the representations. The statistical model may also be combined with user input through the GUI to produce the model. For example, the statistical model data may analyze multiple representations of the semi-structured document to obtain initial definitions of data elements 302-318 and/or relationships 320-360. The initial definitions may then be displayed within the GUI for verification and/or selection of additional parameters (e.g., identification of target data elements) by the user.

After the model is created, the model may be used to locate data elements 302-318 in other representations of the semi-structured document and extract data from one or more of the located data elements. Continuing with the above example, relationships 320, 322, 336, and 342 associated with data element 302 may include the following information:

Relationship 320 is to the left of relationship 322 and defines data element 302 to be 50-100 "units" to the right of the left edge of the semi-structured document.

Relationship 322 is to the right of relationship 320 and defines data element 302 to be 100-150 "units" to the left of data element 304.

Relationship 336 is to the top of relationship 342 and defines data element 302 to be 10-30 "units" below the top edge of the semi-structured document.

Relationship 342 is to the bottom of relationship 336 and defines data element 302 to be 100-200 "units" above data element 308.

As a result, relationships 320, 322, 336, and 342 may be used to identify one or more regions in which data element 302 is likely to be found within other representations of the semi-structured document. For example, the "neutral" positions of springs represented by relationships 320, 322, 336, and 342 may define a circular or elliptical region in which data element 302 may be found with high probability, while the "stretched" positions of the springs may define a larger circular or elliptical region in which data element 302 may be found with lower probability. The regions may be identified using a physics engine that uses the parameters associated with relationships 320, 322, 336 and 342 to simulate the range of motion of the corresponding springs. One or both regions of a given representation of the semi-structured document may then be searched for text and/or a graphical object represented by data element 302.

After data element 302 is found, relationships 322 and 342 between data element 302 and other data elements 304 and 308 may be used to locate the other data elements 304-318 in the representation. For example, the distance of data element 302 from the top and left edges of the representation may be used to establish a scale factor (e.g., "unit" size) for the representation. The scale factor may then be applied to relationships 322 and 342 to identify regions in which data elements 304 and 308 may be found. As each data element is located within the representation, the scale factor may be adjusted, and additional regions for locating additional data elements in the representation may be defined based on the previously located data elements, the scale factor, and relationships associated with the additional data elements.

After data elements 314-318 are found in the representation, data in data elements 314-318 may be extracted for use with one or more applications. For example, the extracted data may be provided to a tax-preparation application so that the user is not required to manually enter the data from the representation into the tax-preparation application. As a result, the model may streamline the use of the data with the application(s).

Figure 4:
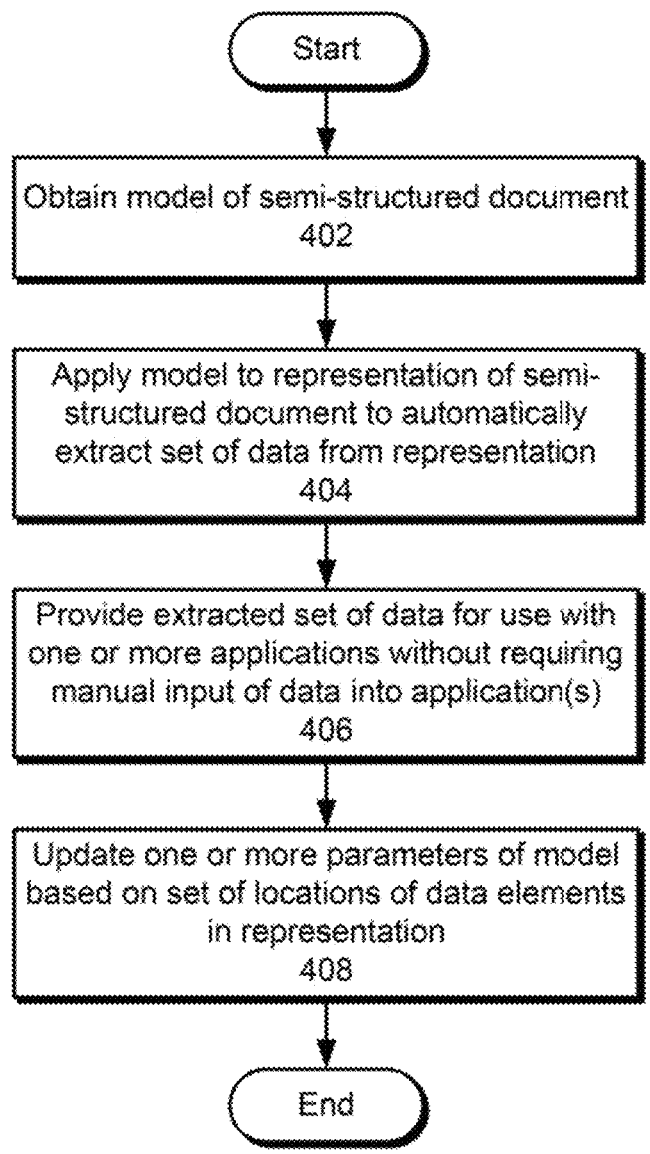
FIG. 4 shows a flowchart illustrating the process of describing a semi-structured document for the purpose of acquiring a set of data elements from the semi-structured document in accordance with the disclosed embodiments.

FIG. 4 shows a flowchart illustrating the process of describing a semi-structured document for the purpose of acquiring a set of data elements from the semi-structured document in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a model of the semi-structured document is obtained (operation 402). The model may include a set of relationships among relative positions of a set of data elements in the semi-structured document. For example, the model may be a Newtonian physics model that describes the relationships in terms of physical objects such as springs, struts, levers, and/or pulleys. The relationships may include parameters such as horizontal components, vertical components, distance components, angular components, directions, and/or weights. To obtain the model, the semi-structured document may be displayed in a GUI, and the relationships may be obtained through the GUI from a user. As an alternative or addition to user input through the GUI, a statistical model may be used to iteratively adjust the relationships based on a set of locations of the data elements in a set of representations of the semi-structured document.

Next, the model is applied to a representation of the semi-structured document to automatically extract a set of data from the representation (operation 404), as discussed in further detail below with respect to FIG. 5. For example, the model may be used to locate a number of target data elements and marker data elements in the representation and extract data from the locations of the target data elements.

The extracted data is then provided for use with one or more applications without requiring manual input of the data into the application(s) (operation 406). For example, the extracted data may be displayed to the user, approved by the user, used to update the user's records, and/or used to perform one or more tasks for the user. Extraction of the data may also reduce time, effort, and/or user error associated with manually entering the data into the application.

Finally, one or more parameters of the model are updated based on the set of locations of the data elements in the representation (operation 408). For example, the locations may be used to adjust the parameter(s) associated with physical objects that represent the relationships so that the model better reflects the relative positions of the data elements in the representation.

Figure 5:
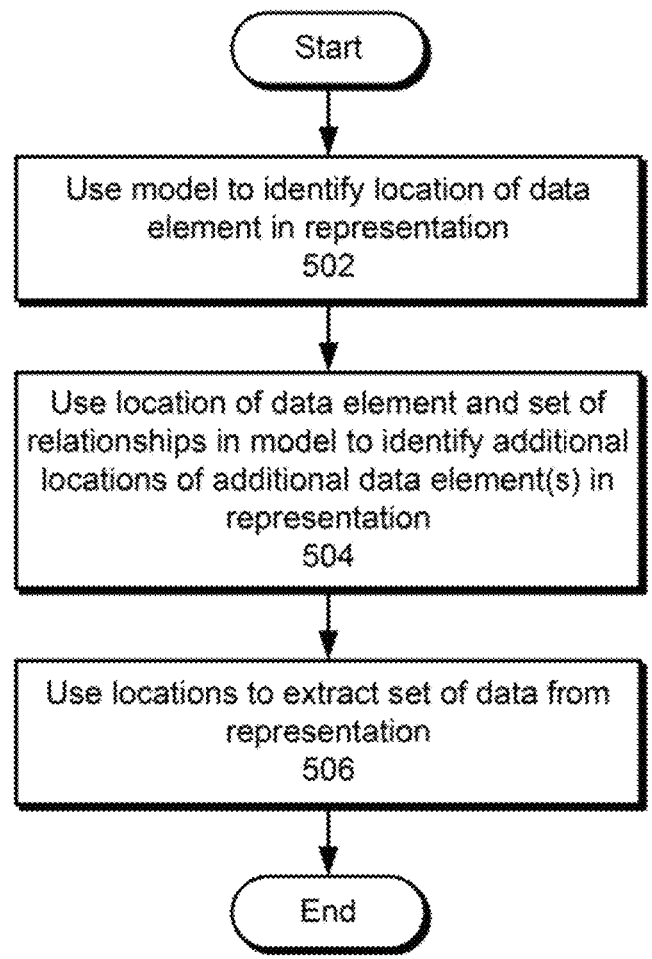
FIG. 5 shows a flowchart illustrating the process of applying a model to a representation of the semi-structured document to automatically extract a set of data from a representation of a semi-structured document in accordance with the disclosed embodiments.

FIG. 5 shows a flowchart illustrating the process of applying a model to a representation of the semi-structured document to automatically extract a set of data from a representation of a semi-structured document in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, the model is used to identify the location of a data element in the representation (operation 502). For example, the model may include one or more relationships between the data element and one or more edges of the semi-structured document. The relationship(s) may be used to define one or more regions in which the data element may be found within the representation, and the region(s) may be searched for the data element.

Next, the location of the data element and the set of relationships in the model are used to identify additional locations of one or more additional data elements in the representation (operation 504). For example, the location of the data element and relationships of the data element with other data elements may be used to define additional regions in which the other data elements may be located. Once a given data element is located in the representation, the location of the data element is used to adjust a scale factor for the representation and/or attributes of the relationships in the model. The scale factor and attributes may then be used to define other regions in the representation from the relationships.

Finally, the locations are used to extract the set of data from the representation (operation 506). For example, the locations of target data elements in the representation are used to extract data in the target data elements from the representation. The extracted data may then be provided for use with an application, as described above.

Figure 6:
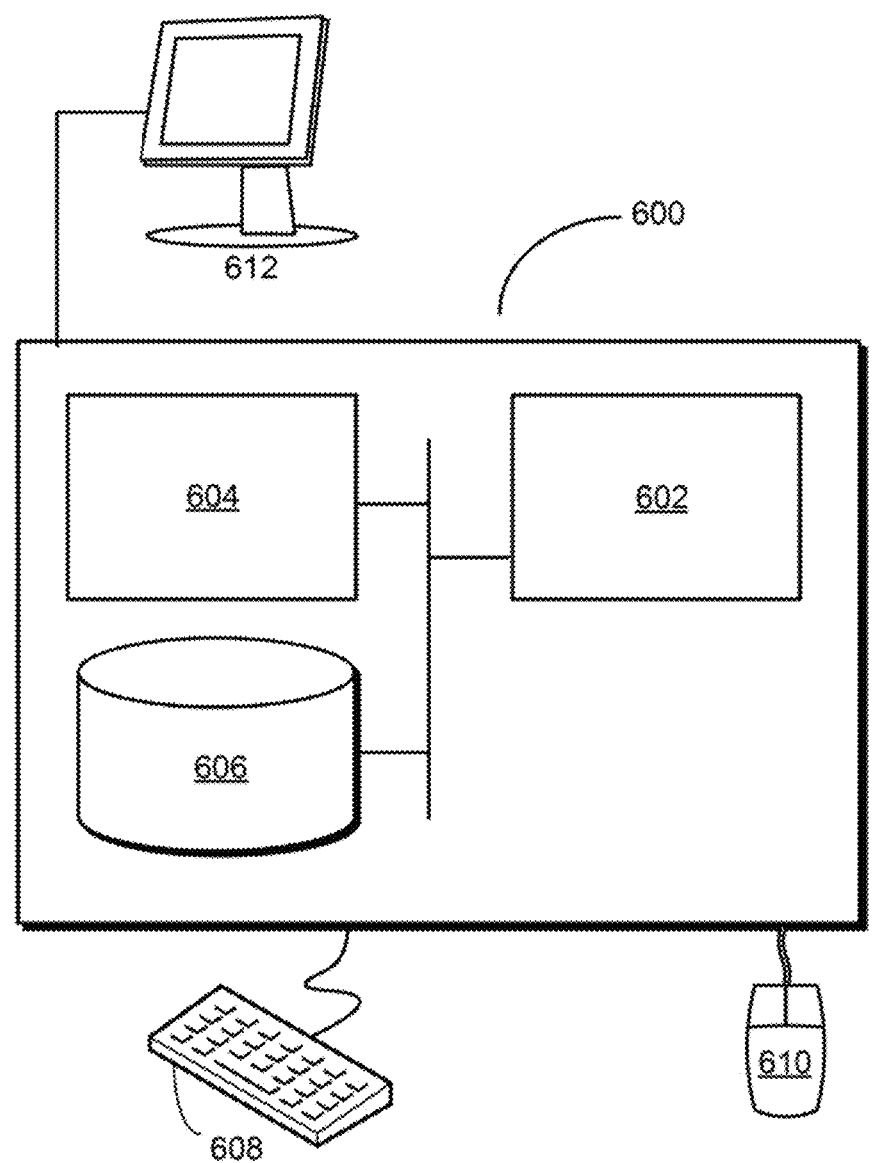
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices such as personal computers, laptop computers, workstations, servers, mobile phones, tablet computers, and/or portable media players. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the disclosed embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for describing a semi-structured document for the purpose of acquiring a set of data elements from the semi-structured document. The system may include a model-creation apparatus that obtains a model of the semi-structured document. The model may include a set of relationships among relative positions of the set of data elements (e.g., target data elements, marker data elements, etc.) in the semi-structured document. The system may also include an extraction apparatus that applies the model to a representation of the semi-structured document to automatically extract a set of data from the representation. Finally, the system may include a management apparatus that provides the extracted set of data for use with one or more applications without requiring manual input of the data into the one or more applications.

In addition, one or more components of computer system 600 may be remotely located and connected to the other components over a network. Portions of the present embodiments (e.g., model-creation apparatus, extraction apparatus, management apparatus, data repository, model repository, etc.) may also be located on different nodes of a distributed system that implements the embodiments. For example, the present embodiments may be implemented using a cloud computing system that uses a set of models to automatically extract data from a set of semi-structured documents for use with one or more applications and a set of remote users.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for extracting data elements from a representation of a semi-structured document based on a physics model describing the semi-structured document, the method comprising:
   obtaining, by one or more computer systems, a physics model of the semi-structured document, wherein the physics model comprises a set of relationships represented by physical objects connecting different data elements in the semi-structured document that describe relative positions of each data element in a set of data elements in the semi-structured document, and wherein a physical object describes a relationship between a first data element and a second data element in the semi-structured document as a function of a distance range between the first and second data elements and at least one of:
      an orientation relationship of the first and second data elements, or
      an angular displacement range between the first and second data elements;
   extracting, by the one or more computer systems, a set of data from the representation of the semi-structured document based on the physical model, wherein the representation of the semi-structured document comprises an electronic file, and wherein extracting the set of data comprises:
      identifying a probable range of positions in the representation of the semi-structured document at which the second data element is located, relative to a position of the first data element in the representation of the semi-structured document, based on the physical object connecting the first and second data elements in the physics model;
      identifying, within the probable range of positions, a position of the second data element in the representation of the semi-structured document;
      extracting data associated with the second data element from information located at the position of the second data element in the representation of the semi-structured document;
      identifying, based on the position of the second data element and physical objects in the physics model describing relationships between the second data element and a plurality of other data elements, position information associated with the plurality of other data elements in the representation of the semi-structured document; and
      extracting data associated with each of the plurality of other data elements from information located, in the representation of the semi-structured document, at the position information associated with each of the plurality of other data elements; and
   upon extracting the set of data from the representation, inputting, by the one or more computer systems, the set of data to one or more applications without requiring manual input of the data into the one or more applications.

2. The computer-implemented method of claim 1, further comprising: updating one or more parameters of the physics model based on a set of locations of the data elements in the representation.

3. The computer-implemented method of claim 1, wherein obtaining the physics model of the semi-structured document comprises:
   displaying, to a user, the semi-structured document in a graphical user interface (GUI); and
   obtaining, through the GUI, the set of relationships among relative positions of the set of data elements from the user.

4. The computer-implemented method of claim 1, wherein obtaining the physics model of the semi-structured document comprises: using a statistical model to identify the set of relationships among relative positions of the set of data elements in the semi-structured document.

5. The computer-implemented method of claim 4, wherein using the statistical model to identify the set of relationships among relative positions of the set of data elements comprises: using the statistical model to iteratively adjust the set of relationships based on a set of locations of the data elements in a set of representations of the semi-structured document.

6. The computer-implemented method of claim 1, wherein the set of data elements comprises:
   a target data element comprising data to be used with the one or more applications; and
   a marker data element comprising an identifiable feature in the semi-structured document.

7. The computer-implemented method of claim 6, wherein the physics model comprises a relationship between a first position of the target data element and a second position of the marker data element.

8. The computer-implemented method of claim 7, wherein the relationship comprises:
   a horizontal component;
   a vertical component; and
   a weight.

9. The computer-implemented method of claim 8, wherein the relationship further comprises: a direction.

10. The computer-implemented method of claim 6, wherein the identifiable feature comprises an image or text.

11. The computer-implemented method of claim 1, wherein applying the physics model to the representation of the semi-structured document to automatically extract the set of data from the representation comprises:
   using the physics model to identify a location of a data element in the representation;
   using the location of the data element and the set of relationships to identify additional locations of one or more additional data elements in the representation; and
   using the location and the additional locations of the one or more additional data elements to extract the set of data from the representation.

12. The computer-implemented method of claim 11, wherein using the location of the data element and the set of relationships to identify the additional locations of the one or more additional data elements in the representation comprises: using the location of the data element and one or more parameters of a relationship between the data element and a third data element to define a region in the representation in which the third data element is located.

13. An apparatus, comprising:
   one or more processors; and
   a memory storing instructions that, when executed by the one or more processors, cause the apparatus to:
      obtain a physics model of a semi-structured document, wherein the physics model comprises a set of relationships represented by physical objects connecting different data elements in the semi-structured document that describe relative positions of each data element in a set of data elements in the semistructured document, and wherein a physical object describes a relationship between a first data element and a second data element in the semi-structured document as a function of a distance range between the first and second data elements and at least one of:
  an orientation relationship of the first and second data elements, or
  an angular displacement range between the first and second data elements;
apply the physics model to a representation of the semi-structured document to automatically extract a set of data from the representation of the semi-structured document based on the physical model, wherein the representation of the semi-structured document comprises an electronic file, and wherein in order to extract the set of data, the apparatus is further configured to:
  identify a probable range of positions in the representation of the semi-structured document at which the second data element is located, relative to a position of the first data element in the representation of the semi-structured document, based on the physical object connecting the first and second data elements in the physics model;
  identify, within the probable range of positions, a position of the second data element in the representation of the semi-structured document;
  extract data associated with the second data element from information located at the position of the second data element in the representation of the semi-structured document;
  identify, based on the position of the second data element and physical objects in the physics model describing relationships between the second data element and a plurality of other data elements, position information associated with the plurality of other data elements in the representation of the semi-structured document; and
  extract data associated with each of the plurality of other data elements from information located, in the representation of the semi-structured document, at the position information associated with each of the plurality of other data elements; and
input the extracted set of data from the representation to one or more applications without requiring manual input of the data into the one or more applications.

14. The apparatus of claim 13, wherein the memory further stores instructions that, when executed by the one or more processors, cause the apparatus to:
  update the physics model based on a set of locations of the set of data elements in the representation.

15. The apparatus of claim 13, wherein in order to obtain the physics model of the semi-structured document, the apparatus is further configured to:
  display, to a user, the semi-structured document in a graphical user interface (GUI); and
  obtain, through the GUI, the set of relationships among relative positions of the set of data elements from the user.

16. The apparatus of claim 13, wherein in order to obtain the physics model of the semi-structured document, the apparatus is further configured to:
  use a statistical model to identify the set of relationships among relative positions of the set of data elements in the semi-structured document.

17. The apparatus of claim 16, wherein in order to use the statistical model to identify the set of relationships among relative positions of the set of data elements, the apparatus is further configured to:
  use the statistical model to iteratively adjust the set of relationships based on a set of locations of the set of data elements in a set of representations of the semi-structured document.

18. The apparatus of claim 13, wherein the set of relationships comprises:
  a distance component;
  an angular component; and
  a weight.

19. A non-transitory computer-readable storage medium storing instructions that when executed by a computer cause the computer to perform a method for extracting data elements from a representation of a semi-structured document based on a physics model describing the semi-structured document, the method comprising:
  obtaining, by one or more computer systems, a physics model of the semi-structured document, wherein the physics model comprises a set of relationships represented by physical objects connecting different data elements in the semi-structured document that describe relative positions of each data element in a set of data elements in the semi-structured document, and wherein a physical object describes a relationship between a first data element and a second data element in the semi-structured document as a function of a distance range between the first and second data elements and at least one of:
    an orientation relationship of the first and second data elements, or
    an angular displacement range between the first and second data elements;
  extracting, by the one or more computer systems, a set of data from the representation of the semi-structured document based on the physical model, wherein the representation of the semi-structured document comprises an electronic file, and wherein extracting the set of data comprises:
    identifying a probable range of positions in the representation of the semi-structured document at which the second data element is located, relative to a position of the first data element in the representation of the semi-structured document, based on the physical object connecting the first and second data elements in the physics model;
    identifying, within the probable range of positions, a position of the second data element in the representation of the semi-structured document;
    extracting data associated with the second data element from information located at the position of the second data element in the representation of the semi-structured document;
    identifying, based on the position of the second data element of the second data element and physical objects in the physics model describing relationships between the second data element and a plurality of other data elements, position information associated with the plurality of other data elements in the representation of the semi-structured document; and
    extracting data associated with each of the plurality of other data elements from information located, in the representation of the semi-structured document, at the position information associated with each of the plurality of other data elements; and upon extracting the set of data from the representation, inputting, by the one or more computer systems, the set of data to one or more applications without requiring manual input of the data into the one or more applications.

20. The non-transitory computer-readable storage medium of claim 19, wherein the physics model is a Newtonian physics model.

* * * * *